US010231106B2

(12) United States Patent
Koshimizu et al.

(10) Patent No.: US 10,231,106 B2
(45) Date of Patent: Mar. 12, 2019

(54) COMMUNICATION SYSTEM, SERVICE CONTROL DEVICE, MTC USER DEVICE, GATEWAY DEVICE, AND COMMUNICATION METHOD

(71) Applicant: NTT DOCOMO, INC., Tokyo (JP)

(72) Inventors: Takashi Koshimizu, Tokyo (JP); Itsuma Tanaka, Tokyo (JP); Irfan Ali, Istanbul (TR)

(73) Assignee: NTT DOCOMO, INC., Tokyo (JP)

( * ) Notice: Subject to any disclaimer, the term of this patent is extended or adjusted under 35 U.S.C. 154(b) by 2 days.

(21) Appl. No.: 15/039,579

(22) PCT Filed: Nov. 14, 2014

(86) PCT No.: PCT/JP2014/080173
§ 371 (c)(1),
(2) Date: May 26, 2016

(87) PCT Pub. No.: WO2015/079932
PCT Pub. Date: Jun. 4, 2015

(65) Prior Publication Data
US 2017/0026774 A1    Jan. 26, 2017

(30) Foreign Application Priority Data
Nov. 29, 2013    (JP) ................. 2013-247963

(51) Int. Cl.
*H04W 4/70*    (2018.01)
*H04L 29/06*    (2006.01)
(Continued)

(52) U.S. Cl.
CPC ............ *H04W 4/70* (2018.02); *H04L 61/103* (2013.01); *H04L 61/256* (2013.01);
(Continued)

(58) Field of Classification Search
CPC ..... H04W 4/005; H04W 88/16; H04W 4/006; H04W 4/14; H04L 67/12
See application file for complete search history.

(56) References Cited

U.S. PATENT DOCUMENTS

2013/0279458 A1* 10/2013 Farkas ............. H04L 29/12273
370/329
2014/0286237 A1* 9/2014 Bhalla .................. H04W 4/005
370/328

(Continued)

FOREIGN PATENT DOCUMENTS

JP    2001345841 A    12/2001
JP    2007020000 A    1/2007
(Continued)

OTHER PUBLICATIONS

International Search Report issued in corresponding application No. PCT/JP2014/080173 dated Jan. 13, 2015 (4 pages).
(Continued)

*Primary Examiner* — Jung H Park
(74) *Attorney, Agent, or Firm* — Osha Liang LLP

(57) ABSTRACT

In a communication system 10, an IN-CSE 200 maps and retains a public IP address acquired from an MTC-UE 100 and an UE-ID, and receives an incoming message addressed to the MTC-UE 100 from an AS 40A. The IN-CSE 200, upon receiving the incoming message, sets the public IP address mapped with the retained UE-ID in a destination address, and delivers to a GGSN/PGW 310 an IP packet containing the corresponding UE-ID. The GGSN/PGW 310 identifies a private IP address assigned to the MTC-UE 100, based on the UE-ID included in the IP packet received from the IN-CSE 200.

9 Claims, 7 Drawing Sheets

(51) Int. Cl.
*H04W 4/14* (2009.01)
*H04W 72/04* (2009.01)
*H04L 29/12* (2006.01)
*H04W 88/02* (2009.01)

(52) U.S. Cl.
CPC ........ *H04L 61/2514* (2013.01); *H04L 65/102* (2013.01); *H04W 4/14* (2013.01); *H04W 72/048* (2013.01); *H04L 61/1511* (2013.01); *H04L 61/2015* (2013.01); *H04L 61/2517* (2013.01); *H04W 88/02* (2013.01)

(56) References Cited

U.S. PATENT DOCUMENTS

| | | | | |
|---|---|---|---|---|
| 2014/0317195 | A1* | 10/2014 | Xu ........................ | H04W 4/005 709/204 |
| 2015/0215725 | A1* | 7/2015 | Xu ........................ | H04W 4/005 455/422.1 |
| 2016/0007390 | A1* | 1/2016 | Starsinic ............... | H04L 61/106 370/328 |
| 2017/0257843 | A1* | 9/2017 | Wang .................... | H04W 4/005 |

FOREIGN PATENT DOCUMENTS

| | | |
|---|---|---|
| JP | 2007036624 A | 2/2007 |
| WO | 2012142618 A2 | 10/2012 |

OTHER PUBLICATIONS

Written Opinion of the International Searching Authority issued in corresponding application No. PCT/JP2014/080173 dated Jan. 13, 2015 (5 pages).

Research in Motion UK Limited, "Translating external ID into internal ID"; SA WG2 Meeting #88, S2-114984; San Francisco, USA; Nov. 14-18, 2011 (4 pages).

3GPP TS 22.368 V12.2.0, "3rd Generation Partnership Project; Technical Specification Group Services and System Aspects; Service requirements for Machine-Type Communications (MTC); Stage 1 (Release 12)"; Mar. 2013 (24 pages).

NTT DOCOMO, "oneM2M Interworking with 3gpp Underlying NW"; oneM2M-Arc-2013-0390R2_1M2M_3GPP_Interworking; Oct. 14-18, 2013 (8 pages).

OneM2M, "oneM2M Functional Architecture"; oneM2M-TS-0001-V-0.2.2; Nov. 8, 2013 (110 pages).

3GPP TS 23.682 V11.5.0, 3rd Generation Partnership Project; Technical Specification Group Services and System Aspects; Architecture enhancements to facilitate communications with packet data networks and applications (Release 11); Sep. 2013 (29 pages).

Office Action issued in corresponding Japanese Application No. 2013-247963, dated May 23, 2017 (8 pages).

Office Action issued in corresponding Japanese Patent Application No. 2013-247963, dated Feb. 6, 2018 (6 pages).

Sierra Wireless, "Small Data Transmission over User Plane via Tsp I/F", SA WG2 Meeting #95, S2-130059, Prague, Czech Republic, Jan. 28-Feb. 1, 2013 (7 pages).

* cited by examiner

FIG. 7

| UE-ID | PORT No. | IP ADDRESS |
|---|---|---|
| 111...222...333 | 1## | 10.10.###.### |
| 111...123...456 | 2## | 20.10.###.### |
| 222...444...555 | 2## | 20.20.###.### |
| ⋮ | ⋮ | ⋮ |

COMMUNICATION SYSTEM, SERVICE CONTROL DEVICE, MTC USER DEVICE, GATEWAY DEVICE, AND COMMUNICATION METHOD

TECHNICAL FIELD

The present invention relates to a communication system including PLMN of the 3GPP standards and an M2M platform, a service control device, an MTC user device, a gateway device, and a communication method.

BACKGROUND ART

Recently, the study of M2M (Machine-to-Machine) technology, in other words, the study of inter-machine communication is progressing. In the M2M technology, machines connected to a communication network communicate with each other without any manual intervention, and appropriate control of the machines is performed automatically. For example, in the 3rd Generation Partnership Project (3GPP), standardization of communication standards related to M2M is in progress under the name of Machine Type Communication (MTC) (for example, see Non-Patent Document 1).

In oneM2M (http://www.onem2m.org/), a study is being conducted regarding interworking between the M2M platform and the Public Land Mobile Network (PLMN) of the 3GPP standards. Specifically, an interface (Y-IF and Z-IF) that connects a Common Service Entity (CSE) constituting the M2M platform, and a Gateway GPRS Support Node/PDN Gateway (GGSN/P-GW) and an MTC-InterWorking Function (MTC-IWF) constituting the PLMN, is being stipulated (For example, see Non-Patent Document 2).

In such an interworking environment, an incoming message from an application server (AS) is received by an MTC-compatible MTC user device by using the conventional short message service (SMS).

PRIOR ART DOCUMENT

Non-Patent Document

Non-Patent Document 1: 3GPP TS 22.368 V12.2.0 Technical Specification Group Services and System Aspects; Service requirements for Machine-Type Communications (MTC); Stage 1 (Release 12), 3GPP; March 2013.
Non-Patent Document 2: oneM2M-ARC-2013-0390R2, "oneM2M Interworking with 3gpp Underlying NW", NTT DOCOMO; October 2013.

SUMMARY OF THE INVENTION

However, inter-working between the M2M platform and the PLMN of 3GPP specifications explained above has the following problems. In other words, because a short message service (SMS) is used to receive an incoming message from an AS to an MTC-UE, it is necessary to implement a functionality of an SMS client in the MTC-UE. The SMS is a conventionally used service, and because it is not an Internet protocol (IP)-based service, the protocol stack is complicated. Therefore, the cost of implementation and management has become an issue.

On the other hand, to receive an incoming message from an IP-based AS to the MTC-UE, a private IP address is used within the PLMN. Network Address Translation (NAT), a functionality to execute a conversion between a public IP address and a private IP address, exists in a GGSN/P-GW.

Therefore, for an incoming message from an AS positioned outside the PLMN to be received by the MTC-UE, it is necessary to solve an issue regarding the NAT. As a method to solve the issue regarding the NAT (NAT traversal), for example, Interactive Connectivity Establishment (ICE) is known. However, extensions for using the appropriate functions, for example, implementing a browser function, and the like in the MTC-UE, are required. Therefore, this method is not suitable for the MTC-UE that needs to be compact and inexpensive.

The present invention has been made in view of the above circumstances. It is an object of the present invention to provide a communication system, a service control device, an MTC user device, a gateway device, and a communication method that allow an incoming message to be received by the MTC user device from an application server that operates according to an IP-based protocol and receives the message at low cost without using an SMS in an environment where a NAT is used.

According to a first aspect of the present invention, a communication system includes a radio communication network that includes a gateway device that can be connected by radio to an MTC user device that executes an inter-machine communication and that executes a conversion between a private IP address and a public IP address assigned to the MTC user device; and an M2M platform that includes a service control device that is connected to the radio communication network and that controls a service related to the inter-machine communication, wherein the MTC user device includes an IP address notifying unit that notifies the service control device of the public IP address assigned by the radio communication network, the service control device includes an IP address acquiring unit that acquires the public IP address notified from the MTC user device, a retaining unit that maps and retains the public IP address acquired by the IP address acquiring unit and a device identifier for identifying the MTC user device, an incoming message receiving unit that receives an incoming message addressed to the MTC user device from an application server positioned outside the radio communication network, and an IP packet processing unit that sets, when the incoming message receiving unit received the incoming message, the public IP address mapped with the device identifier retained in the retaining unit in a destination address, and delivers an IP packet containing the device identifier to the gateway device, and the gateway device includes an address identifying unit that identifies, based on the device identifier included in the IP packet received from the service control device, a private IP address assigned to the MTC user device.

According to a second aspect of the present invention, a service control device that is connected to a radio communication network that includes a gateway device that executes a conversion between a private IP address and a public IP address assigned to an MTC user device that executes an inter-machine communication, and that controls a service related to the inter-machine communication, the service control device includes an IP address acquiring unit that acquires the public IP address assigned to the MTC user device, a retaining unit that maps and retains the public IP address acquired by the IP address acquiring unit and a device identifier for identifying the MTC user device, an incoming message receiving unit that receives an incoming message addressed to the MTC user device from an application server positioned outside the radio communication network, and an IP packet processing unit that sets, when the incoming message receiving unit received the incoming message, the public IP address mapped with the device identifier retained in the retaining unit in a destination address, and delivers an IP packet containing the device identifier to the gateway device.

According to a third aspect of the present invention, an MTC user device that executes an inter-machine communication with an M2M platform that constitutes a service control device, and that can be connected by radio to a radio communication network that includes a gateway device that executes a conversion between a private IP address and a public IP address, the MTC user device includes an IP address notifying unit that notifies the service control device of a public IP address assigned by the radio communication network.

According to a fourth aspect of the present invention, a gateway device that executes a conversion between a private IP address and a public IP address assigned to an MTC user device that executes an inter-machine communication, the gateway device includes an address identifying unit that identifies a private IP address assigned to the MTC user device based on a device identifier for identifying the MTC user device included in the IP packet received from a service control device that executes a service related to the inter-machine communication.

According to a fifth aspect of the present invention, a communication method that uses a radio communication network that includes a gateway device that can be connected by radio to an MTC user device that executes an inter-machine communication and that executes a conversion between a private IP address and a public IP address assigned to the MTC user device, and an M2M platform that includes a service control device that is connected to the radio communication network and that controls a service related to the inter-machine communication, the communication method includes the MTC user device notifying the service control device of a public IP address assigned by the radio communication network; the service control device acquiring the public IP address notified from the MTC user device, mapping and retaining the acquired public IP address and a device identifier for identifying the MTC user device, receiving an incoming message addressed to the MTC user device from an application server positioned outside the radio communication network, and setting, upon receiving the incoming message, the public IP address that is mapped with the retained device identifier in a destination address, and delivering an IP packet containing the device identifier to the gateway device, and the gateway device identifying, based on the device identifier included in the IP packet received from the service control device, a private IP address assigned to the MTC user device.

BRIEF DESCRIPTION OF DRAWINGS

FIG. 7 shows an example of an address table retained in an address table retaining unit 203 according to the embodiment of the present invention.

MODES FOR CARRYING OUT THE INVENTION

Figure 1:
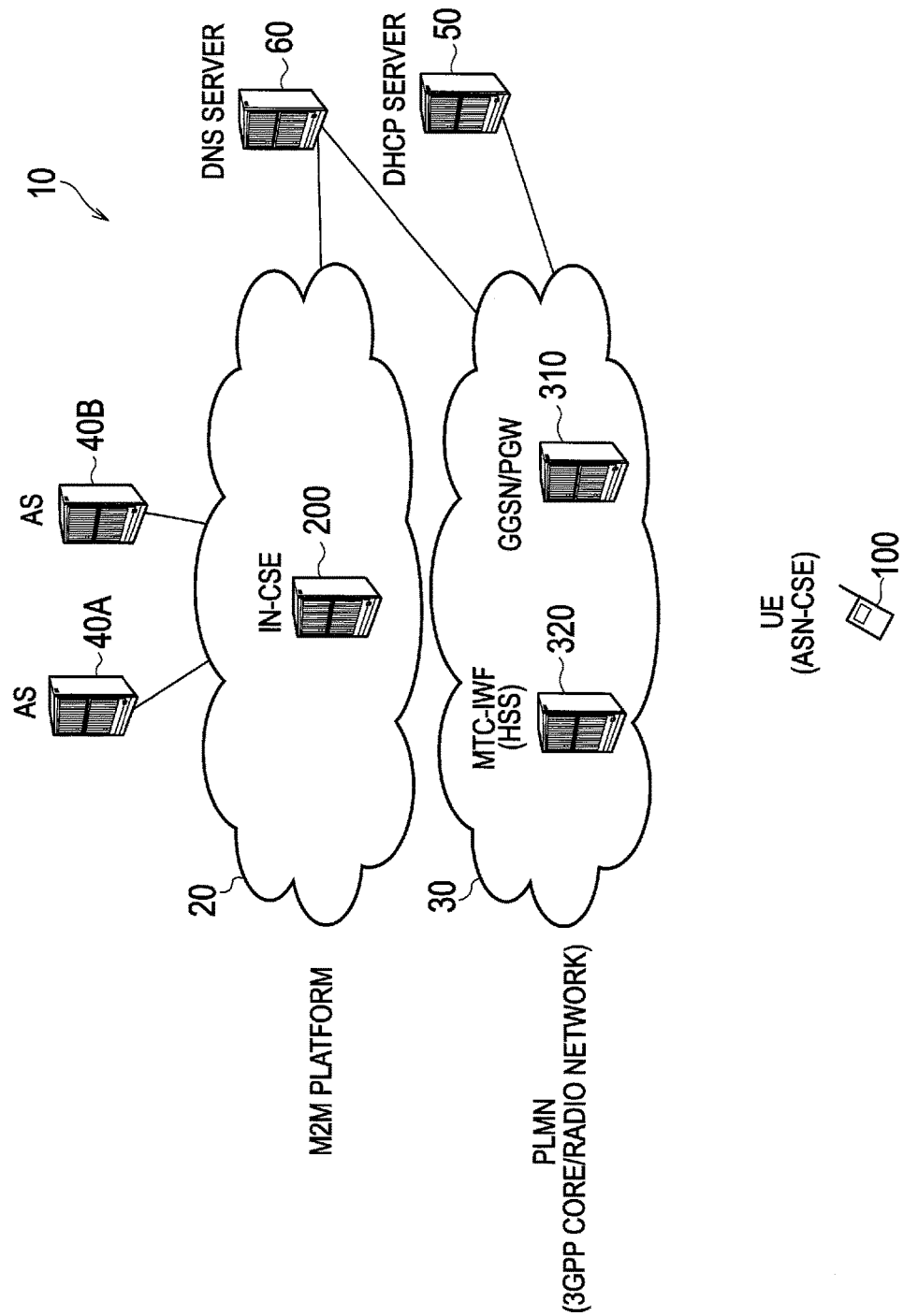
FIG. 1 is an overall schematic structural diagram of a communication system 10 according to an embodiment of the present invention.

Exemplary embodiments of the present invention are explained below. With regard to the representation in the drawings, the same or similar components have been denoted by the same or similar reference numerals/signs. The drawings are only schematic and the ratios of dimensions and the like shown in the drawings may differ from the actual ratios.

Therefore, specific dimensions and the like shall be determined after taking the following explanation into account. Moreover, it is a matter of course that the relations or ratios of mutual dimensions may differ among the drawings.

(1) Overall Schematic Configuration of Communication System

FIG. 1 is an overall schematic structural diagram of a communication system 10 according to the present embodiment. As shown in FIG. 1, the communication system 10 includes an M2M platform 20, and a Public Land Mobile Network 30 (hereinafter, "PLMN 30"). Moreover, the communication system 10 includes a Machine Type Communication-User Equipment 100 (hereinafter, "MTC-UE 100").

Application servers 40A and 40B (hereinafter, "AS 40A and AS 403") are connected to the M2M platform 20. The AS 40A and AS 40B can execute an inter-machine communication with the MTC-UE 100 via the M2M platform 20 and the PLMN 30. The AS 40A and AS 40B execute a specific application (for example, data collection management of a power meter connected to the MTC-UE 100, position information management of the MTC-UE 100, and the like) based on the data output by the MTC-UE 100.

Moreover, a DHCP server 50 and a DNS server 60 are connected to the communication system 10. The DHCP server 50 assigns an IP address (private/public IP address) to the MTC-UE 100. The DNS server 60 provides an IP address mapped with a domain name, and executes name resolution.

The M2M platform 20 fulfills the requirements for the M2M platform (M2M-PF) being studied at the oneM2M (http://www.onem2 m.org/), and provides a functionality to optimize a service that utilizes the data transmitted by the MTC-UE 100, and the like. The M2M platform 20 includes an Infrastructure Node Common Service Entity 200 (hereinafter, "IN-CSE 200").

The PLMN 30 is a 3G (W-CDMA) stipulated in the 3rd Generation Partnership Project (3GPP), or a radio communication network (public mobile communication network) according to the Long Term Evolution (LTE). The PLMN 30 can be connected by radio to the MTC-UE 100 that executes the inter-machine communication. The PLMN 30 includes a Gateway GPRS Support Node/PDN Gateway 310 (hereinafter, "GGSN/PGW 310") and an MTC-InterWorking Function 320 (hereinafter, "MTC-IWF 320").

The MTC-UE 100 is a user device capable of executing the inter-machine communication, and is equivalent to an Application Service Node (ASN) CSE (ASN-CSE) in the oneM2M.

The IN-CSE 200 controls a service related to the inter-machine communication. Specifically, the IN-CSE 200 performs processes such as processing an incoming message from the AS 40A and AS 40B to the MTC-UE 100, relaying an IP packet between the MTC-UE 100 and the AS 40A and AS 40B. The IN-CSE 200 is equipped with the functionality of Service Capability Server (SCS) available in the oneM2M. In the present embodiment, the IN-CSE 200 constitutes a service control device.

The GGSN/PGW 310 is a gateway node to access a packet, and performs controls such as a QoS control, a bearer setting control, and the like in the PLMN 30. Moreover, the GGSN/PGW 310 executes a conversion between a private IP address and a public IP address assigned to the MTC-UE 100. In the present embodiment, the GGSN/PGW 310 constitutes a gateway device. In the present embodiment, a network that uses IPv4 is assumed.

The MTC-IWF 320 provides functionality required for interworking between the M2M platform 20 and the PLMN 30. Specifically, the MTC-IWF 320 derives an identifier of the MTC-UE 100 (Int-ID) used within the PLMN 30 from an identifier of the MTC-UE 100 (Ext-ID) used outside the PLMN 30. The MTC-IWF 320 functionality is provided through a Home Subscriber Server (HSS) stipulated in the 3GPP.

(2) Functional Block Configuration of Communication System

A functional block configuration of the communication system 10 will be explained below. Specifically, functional block configuration of the MTC-UE 100, the IN-CSE 200, and the GGSN/PGW 310 will be explained.

(2.1) MTC-UE 100

Figure 2:
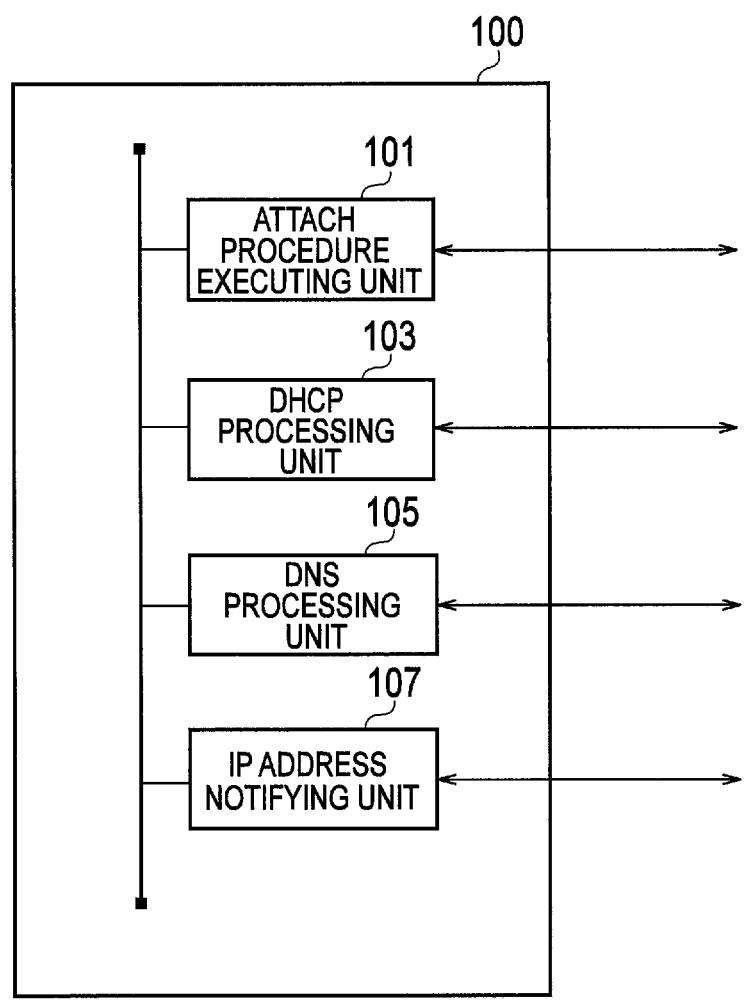
FIG. 2 is a functional block diagram of an MTC-UE 100 according to the embodiment of the present invention.

FIG. 2 is a functional block diagram of the MTC-UE 100. As shown in FIG. 2, the MTC-UE 100 includes an attach procedure executing unit 101, a DHCP processing unit 103, a DNS processing unit 105, and an IP address notifying unit 107.

The attach procedure executing unit 101 executes an attach procedure with the PLMN 30. Specifically, the attach procedure executing unit 101 executes the attach procedure with the GGSN/PGW 310 in accordance with 3GPP standards such as TS23.401 and TS23.060, and sets a communication bearer and the like.

The DHCP processing unit 103 executes a process in accordance with the Dynamic Host Configuration Protocol (DHCP). Specifically, the DHCP processing unit 103 transmits DHCP Query to the DHCP server 50, and acquires an IP address of the DNS server 60. Moreover, the DHCP processing unit 103 can also acquire a list of domain names (FQDN) of the IN-CSE 200 to be targeted.

The DNS processing unit 105 executes a process in accordance with Domain Name System (DNS). Specifically, the DNS processing unit 105 transmits DNS Query to the DNS server 60, and acquires a domain name and an IP address of the IN-CSE 200 to be targeted.

The IP address notifying unit 107 notifies the M2M platform 20 of the IP address assigned by the PLMN 30. Specifically, the IP address notifying unit 107 notifies the IN-CSE 200 of the IP address assigned by the PLMN 30.

If the IP address (that is, a transmission destination) assigned to the MTC-UE 100 is remapped by a Network Address Translation (NAT) functionality in the GGSN/PGW 310, the IP address notifying unit 107 can notify the IN-CSE 200 of the remapped address, for example, a public IP address (same as a global IP address in the NAT) and a UE-ID of the MTC-UE 100 itself. Moreover, if the public IP address assigned to the MTC-UE 100 is remapped due to relocation of a radio base station (NB or eNB) constituting the PLMN 30, the IP address notifying unit 107 can similarly notify the IN-CSE 200 of the public IP address and the UE-ID of the MTC-UE 100 itself.

(2.2) IN-CSE 200

Figure 3:
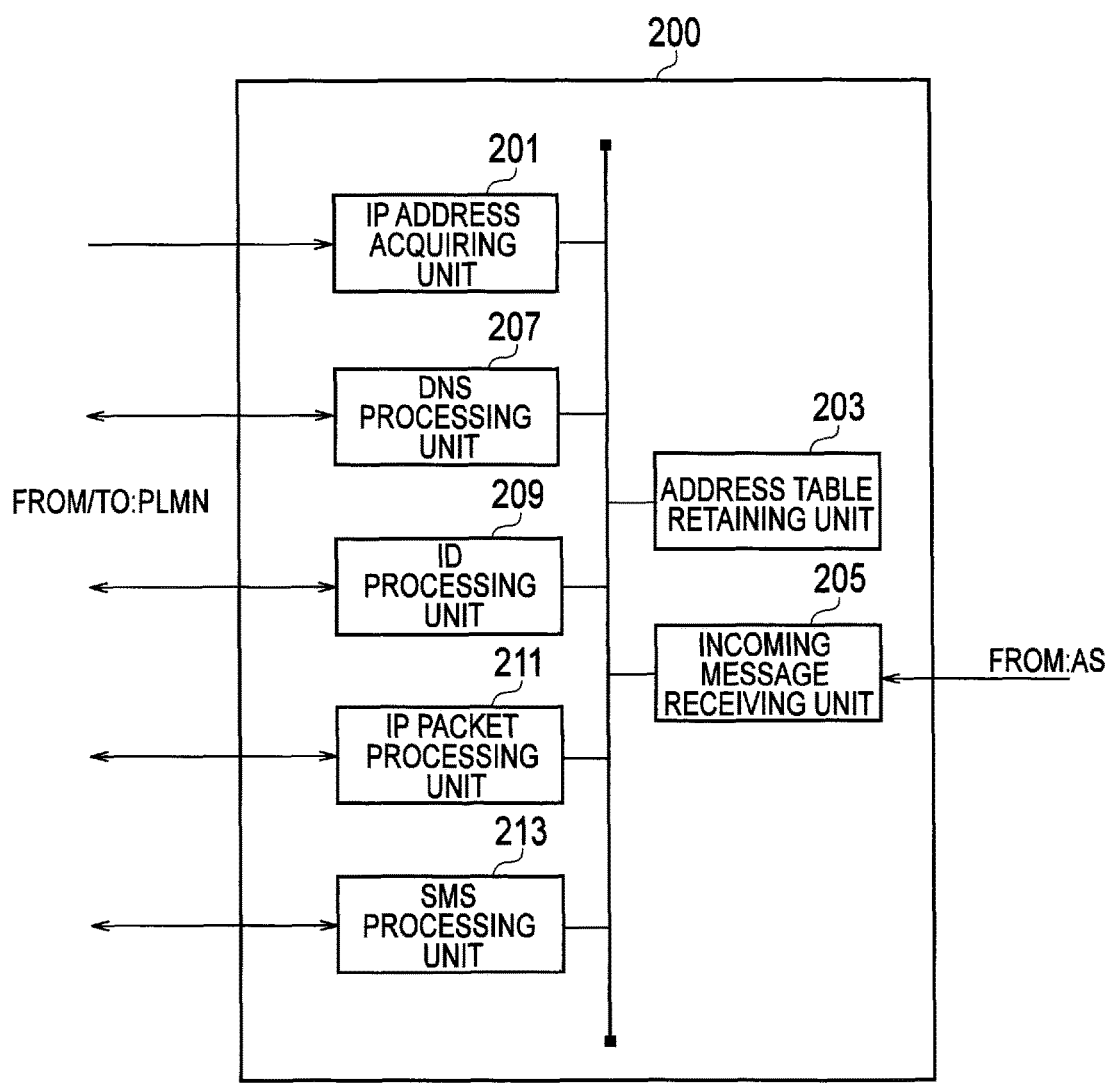
FIG. 3 is a functional block diagram of an IN-CSE 200 according to the embodiment of the present invention.

FIG. 3 is a functional block diagram of the IN-CSE 200. As shown in FIG. 3, the IN-CSE 200 includes an IP address acquiring unit 201, an address table retaining unit 203, an incoming message receiving unit 205, a DNS processing unit 207, an ID processing unit 209, an IP packet processing unit 211, and an SMS processing unit 213.

The IP address acquiring unit 201 acquires the IP address notified from the MTC-UE 100. Specifically, the IP address acquiring unit 201 acquires a public IP address assigned to the MTC-UE 100 via the PLMN 30. Moreover, the IP address acquiring unit 201 can acquire the corresponding public IP address and the UE-ID of the MTC-UE 100 itself from the MTC-UE 100. Furthermore, the IP address acquiring unit 201 can acquire the corresponding public IP address and the UE-ID of the MTC-UE 100 itself from the GGSN/PGW 310.

The address table retaining unit 203 retains an address table containing the mapping of an IP address and a device to which the corresponding IP address is assigned. Specifically, the address table retaining unit 203 maps and retains the IP address (public IP address) acquired from the IP address acquiring unit 201 and the UE-ID (device identifier) identifying the MTC-UE 100.

FIG. 7 shows an example of the address table retained in the address table retaining unit 203. As shown in FIG. 7, the UE-ID, the IP address, and a port number of a transport layer are mapped in the address table.

International Mobile Equipment Identity Software Version (IMEI-SV), M2M-Node-ID, Mobile Subscriber ISDN Number (MSISDN), Terminated-CSE-ID or International Mobile Subscriber Identity (IMSI), and the like can be used as the UE-ID. FIG. 7 shows an example where the IMSI (for example, a decimal number having 15 digits or less) is used as the UE-ID. The IP address (the public IP address) assigned to a corresponding UE (the MTC-UE 100) is mapped with each UE-ID. While the port number is further mapped with the UE-ID and the IP address in the address table shown in FIG. 7, the port number is not mandatory. When the same IP address (public IP address) is assigned to multiple UEs in the IP network using the NAT, the port number is used to identify the UEs. Therefore, in the present embodiment, the port number will be treated in the same manner as the UE-ID.

The incoming message receiving unit 205 receives an incoming message addressed to the MTC-UE 100 from the AS 40A and AS 40B connected to the M2M platform 20. In other words, the incoming message receiving unit 205 receives an incoming message addressed to the MTC-UE 100 from the AS 40A and AS 40B that are positioned outside the PLMN 30. Specifically, the incoming message receiving unit 205 receives MT IP Triggering Request from the AS 40A and AS 40B.

The DNS processing unit 207 executes a process in accordance with the DNS. Specifically, the DNS processing unit 207 transmits the DNS Query to the DNS server 60, and based on the UE-ID (Terminated CSE-ID), acquires an IP address of the MTC-UE 100 to be targeted. Furthermore, if the DNS processing unit 207 does not recognize the detailed information regarding a network configuration (including the IP address) within the PLMN 30, the DNS processing unit 207 transmits the DNS Query to the DNS server 60 by using the identifier of the MTC-UE 100 (Ext-ID) used outside the PLMN 30, and acquires an IP address of the MTC-IWF 320.

The ID processing unit 209 executes a process related to the identifier of the MTC-UE 100 (UE-ID). Specifically, the ID processing unit 209 can acquire from the PLMN 30 an Int-ID (internal device identifier) that can identify the MTC-UE 100 within the PLMN 30 and that is mapped with the UE-ID in the address table (refer to FIG. 7) retained in the address table retaining unit 203. In the present embodiment, the ID processing unit 209 constitutes an identifier acquiring unit.

The IP packet processing unit 211 processes an IP packet transmitted/received between the MTC-UE 100 and the AS 40A and AS 40B. Specifically, the IP packet processing unit 211 performs processes such as setting a destination address and a source address of the IP packet, delivering the IP packet to the corresponding device based on the destination address of the IP packet.

Particularly, in the present embodiment, when the incoming message receiving unit 205 receives an incoming message addressed to the MTC-UE 100 from the AS 40A and AS 40B, the IP packet processing unit 211 sets the public IP address mapped with the UE-ID retained in the address table retaining unit 203 as the destination address, and delivers the IP packet containing the corresponding UE-ID to the GGSN/PGW 310. Moreover, upon receiving a positive acknowledgment (Delivered IP packet Ack (UE-ID, UE public IP address)) from the GGSN/PGW 310 for the IP packet containing the corresponding UE-ID and the public IP address mapped to the UE-ID delivered to the GGSN/PGW 310, the IP packet processing unit 211 transmits an incoming message response (MT IP Triggering Ack (confirmed UE public IP address)) including the public IP address set as the destination address of the IP packet to the AS 40A (or the AS 40B).

If the public IP address assigned to the MTC-UE 100 is shared by multiple MTC user devices, the IP packet processing unit 211 can deliver the IP packet containing the port number of the transport layer mapped with the UE-ID and the public IP address to the GGSN/PGW 310.

The IP packet processing unit 211 can deliver the IP packet containing, instead of the UE-ID (Ext-ID), the Int-ID (internal device identifier) acquired from the ID processing unit 209 to the GGSN/PGW 310.

The SMS processing unit 213 executes a process related to the short message service (SMS) that does not use the Internet protocol (IP). The SMS operations executed here, however, are the operations stipulated in the 3GPP (for example, TS23.682), and are also explained in Section X.6.1.2 of the Non-Patent Document 2 mentioned above. In the present embodiment, if the IP packet processing unit 211 is unable to receive the positive acknowledgment (Delivered IP packet Ack (UE-ID, UE public IP address) of the IP packet delivered to the GGSN/PGW 310, the SMS processing unit 213 uses an SMS to notify the MTC-UE 100 of the incoming message from the AS 40A and AS 40B.

(2.3) GGSN/PGW 310

Figure 4:
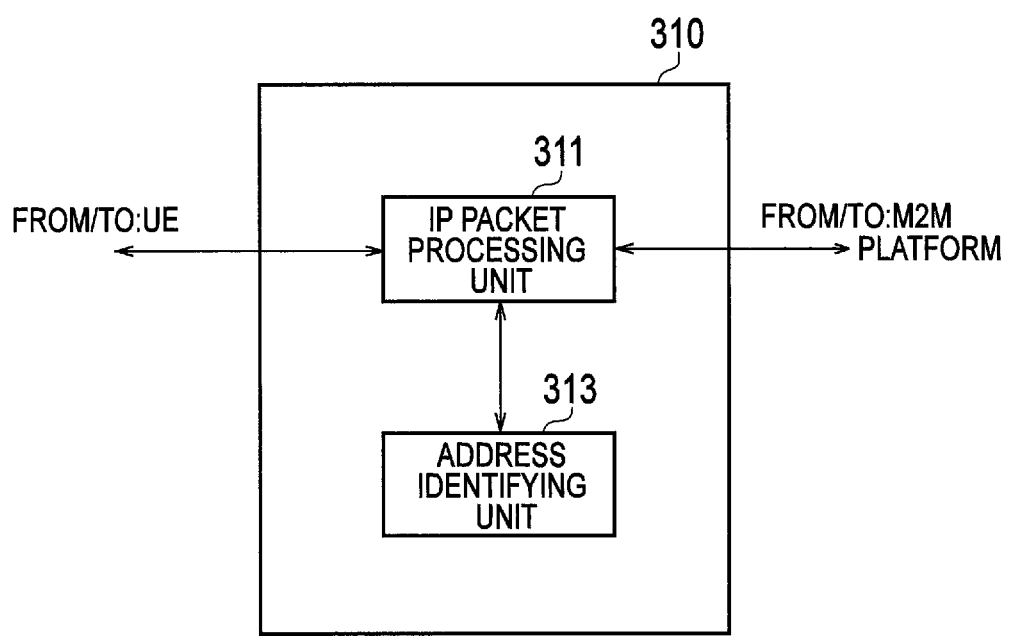
FIG. 4 is a functional block diagram of a GGSN/PGW 310 according to the embodiment of the present invention.

FIG. 4 is a functional block diagram of the GGSN/PGW 310. As shown in FIG. 4, the GGSN/PGW 310 includes an IP packet processing unit 311 and an address identifying unit 313.

The IP packet processing unit 311 performs the delivering process of the IP packet in the PLMN 30. The IP packet processing unit 311 is equipped with the Network Address Translation (NAT) functionality. The IP packet processing unit 311 executes a conversion between the public IP address to be used in the PLMN 30 and the private IP address to be used within the PLMN 30 (private network).

The IP packet processing unit 311 delivers, based on the private IP address identified by the address identifying unit 313, an IP packet in which the corresponding private address is set as the destination address to the MTC-UE 100. Moreover, the IP packet processing unit 311 transmits the positive acknowledgment, that is, Delivered IP packet Ack (UE-ID, UE public IP address including the UE-ID to the IN-CSE 200, based on the Delivered Ack received from the MTC-UE 100. If the MTC-UE 100 has transmitted the Delivered Ack without including the public IP address, the IP packet processing unit 311 assigns a public IP address corresponding to the MTC-UE 100, includes the public IP address in the Delivered IP packet Ack (UE-ID, UE public IP address, and then transmits the Delivered IP packet Ack to the IN-CSE 200. Once the Delivered IP packet Ack (UE-ID, UE public IP address is transmitted to the IN-CSE 200, direct IP packet transmission/reception (End-to-End transmission) becomes possible between the MTC-UE 100 and the AS 40A (or the AS 403).

The address identifying unit 313 identifies, based on the UE-ID of the MTC-UE 100 (for example, the IMSI) included in an IP packet received from the IN-CSE 200, the private IP address assigned to the MTC-UE 100. The address identifying unit 313 notifies the IP packet processing unit 311 of the identified private IP address.

(3) Operation of Communication System

How the communication system 10 operates will be explained below. Specifically, registration of a UE-ID and an IP address by the MTC-UE 100 to the IN-CSE 200, and reception of an incoming message from the AS 40A to the MTC-UE 100 will be explained.

(3.1) Registration of UE-ID and IP Address by MTC-UE 100 to IN-CSE 200

Figure 5:
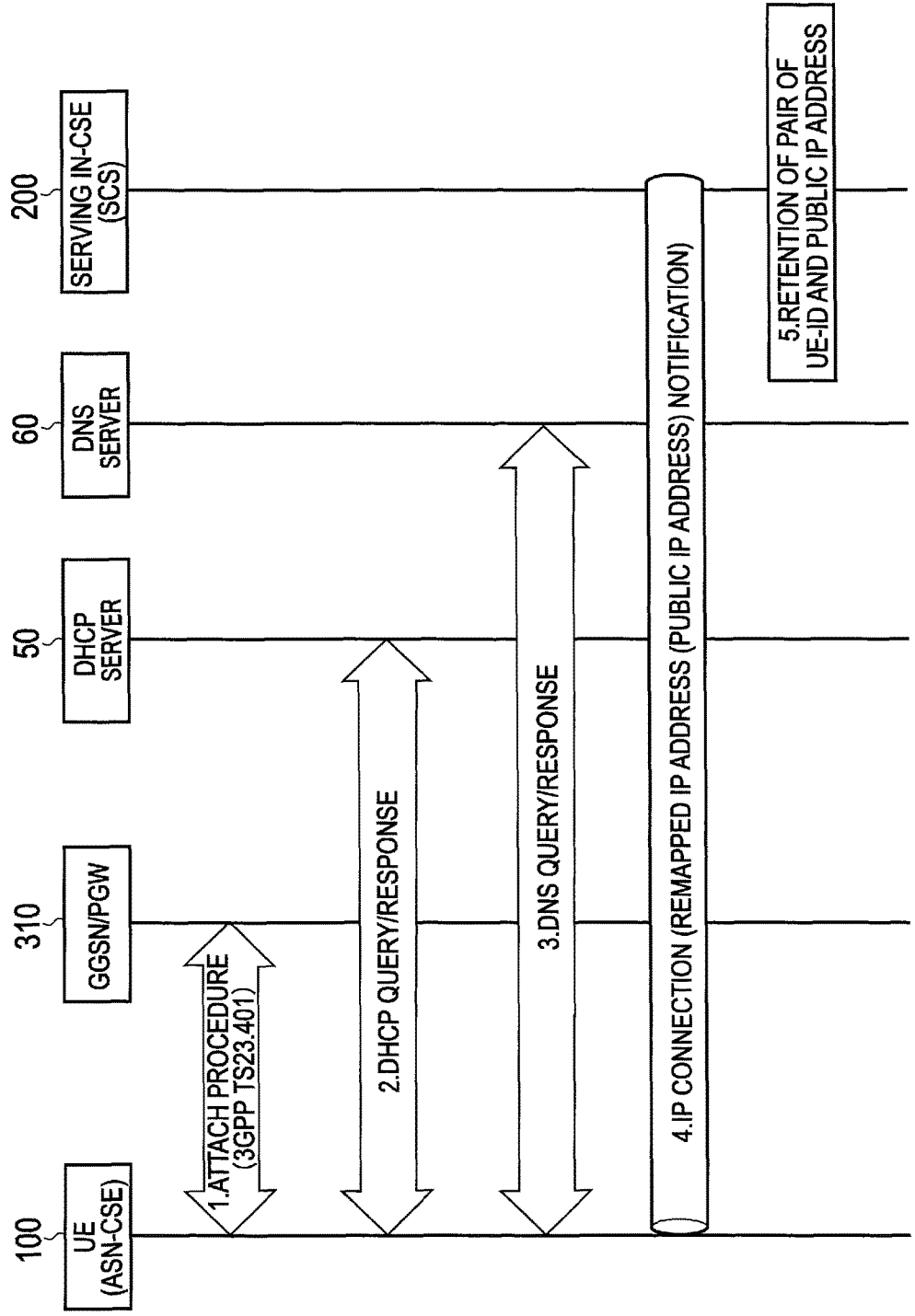
FIG. 5 shows a sequence of registration of an IP address and a UE-ID to the IN-CSE 200 in accordance with an attach procedure between a PLMN 30 and the MTC-UE 100 according to the embodiment of the present invention.

FIG. 5 shows a sequence of registration of an IP address and a UE-ID to the IN-CSE 200 in accordance with an attach procedure between the PLMN 30 and the MTC-UE 100. As shown in FIG. 5, the MTC-UE 100 executes the attach procedure with the PLMN 30 according to the 3GPP standards (TS23.401 and TS23.060) (Step 1). Specifically, the MTC-UE 100 executes an attach procedure with the GGSN/PGW 310, and sets a communication bearer and the like.

Subsequently, the MTC-UE 100 transmits the DHCP Query including an Access Point Name (APN) and the like of Packet Data NW (PDN) to be connected to the DHCP server 50, and acquires the IP address of the DNS server 60 (Step 2). Moreover, the MTC-UE 100 transmits the DNS Query to the DNS server 60, and acquires an IP address of the IN-CSE 200 to be targeted (Step 3).

The MTC-UE 100 starts a communication with the IN-CSE 200 based on the acquired IP address of the IN-CSE 200 (Serving IN-CSE) (Step 4). Specifically, the MTC-UE 100 sets up an IP connection with the IN-CSE 200. Moreover, the MTC-UE 100, when setting up the IP connection, notifies the IN-CSE 200 of the remapped IP address (public IP address) of the MTC-UE 100 assigned during the attach procedure with the GGSN/PGW 310 and the UE-ID of the MTC-UE 100 itself, and prompts the IN-CSE 200 to update the retained address table (refer to FIG. 7).

If the MTC-UE 100 cannot directly notify the IN-CSE 200 of the assigned public IP address, for example if the public IP address is assigned to the GGSN/PGW 310, instead of notifying by the MTC-UE 100, the GGSN/PGW 310 can notify the IN-CSE 200 of the public IP address and the UE-ID of the MTC-UE 100. Moreover, if the UE-ID can be recognized, for example, when the UE-ID of the MTC-UE 100 is already retained by the IN-CSE 200, it is not necessary for the MTC-UE 100 to transmit the corresponding UE-ID.

The IN-CSE 200 retains, based on the remapped IP address (public IP address) notified from the MTC-UE 100 (or the GGSN/PGW 310), a pair of the UE-ID of the MTC-UE 100 and the notified remapped IP address, and updates the address table.

The IMEI-SV, the M2M-Node-ID, the MSISDN, the Terminated-CSE-ID, or the IMSI can be used as the UE-ID. An example where the IMSI is used as the UE-ID will be explained below. Moreover, as explained above, the MTC-UE 100 notifies, even when the public IP address (transmission destination) assigned to the MTC-UE 100 is remapped due to the relocation of the radio base station (NB or eNB) constituting the PLMN 30, or the reassignment of the public IP address by the NAT, the IN-CSE 200 of the corresponding public IP address.

(3.2) Reception of Incoming Message from AS 40A to MTC-UE 100

Figure 6:
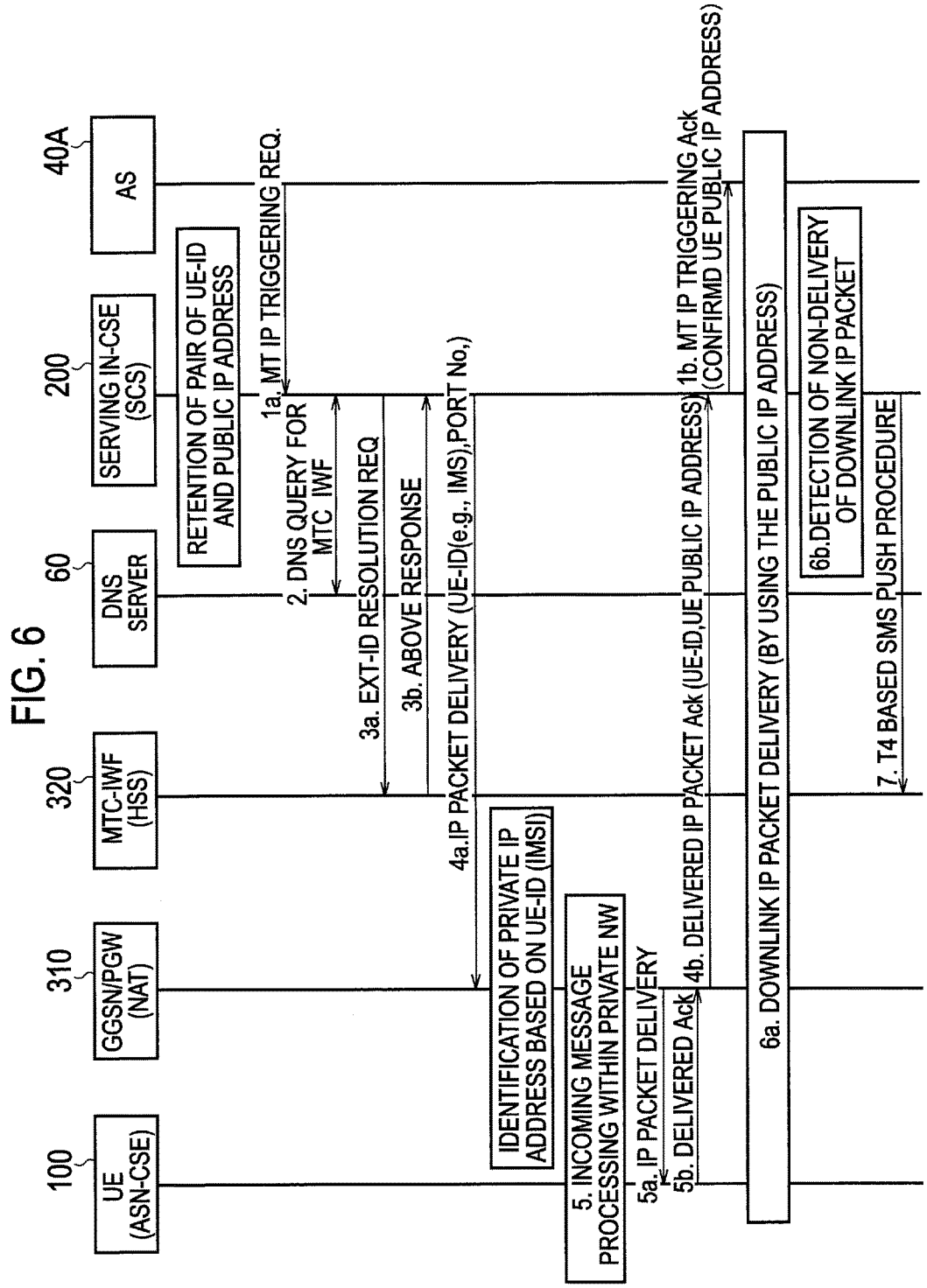
FIG. 6 shows a sequence of an incoming message from an AS 40A to the MTC-UE 100 according to the embodiment of the present invention.

FIG. 6 shows a sequence of reception of an incoming message from the AS 40A to the MTC-UE 100. As shown in FIG. 6, the IN-CSE 200, while a pair of the UE-ID of the MTC-UE 100 and the public IP address assigned to the MTC-UE 100 by the NAT implemented in the GGSN/PGW 310 is being retained, receives an incoming message from the AS 40A to the MTC-UE 100. Specifically, the IN-CSE 200 receives the MT IP Triggering Request including the UE-ID (such as Terminated-CSE-ID that can uniquely identify the MTC-UE 100) (Step 1a).

The IN-CSE 200 transmits, based on the UE-ID included in the received MT IP Triggering Request or the network information of the PLMN 30 on which the MTC-UE 100 is positioned, the DNS Query to the DNS server 60, and acquires an IP address of the MTC-IWF 320 (Step 2). For example, when the LTE-ID is described in an FQDN format that includes the network information, such as mtcUE0001.nttdocomo.co.jp, the incoming message address to a specific network can be identified. The reason why the IN-CSE 200 does not transmit an IP packet to the MTC-UE 100 at this point is because whether the IP address corresponding to the destination UE-ID retained by the IN-CSE 200 is a valid transmission destination is unclear. Moreover, by executing the processing at Step 2, even if the owners (operators) of the IN-CSE 200 (SCS) and the PLMN 30 (the MTC-IWF 320) are different and separate owners, the incoming message can be received by the MTC-UE 100. If it is clear that the owner (operator) of the IN-CSE 200 and the MTC-IWF 320 is the same, this step is not required.

The IN-CSE 200 transmits, based on the acquired IP address of the MTC-IWF 320, an Ext-ID-Int-ID Resolution Request to the MTC-IWF 320, and receives a response for the Ext-ID-Int-ID Resolution Request (Steps 3a and 3b). Through such processing, the IN-CSE 200 acquires an Int-ID from the MTC-IWF 320. That is, the IN-CSE 200 derives the identifier of the MTC-UE 100 (Int-ID) used within the PLMN 30 based on the identifier of the MTC-UE 100 (Ext-ID) used outside the PLMN 30. An example in which the IMSI is used as the Int-ID will be explained below. The Ext-ID or the Int-ID needs not necessarily be the IMSI, but can be any ID that can be used as the UE-ID explained above.

Moreover, the Ext-ID and the Int-ID are the unique UE-IDs that can identify the MTC-UE 100 within and outside the PLMN 30, and are like to a name given to the UE to be identified. The Int-ID identifies an address of the transmission destination in a valid closed network (PLMN), and is used to transmit an IP packet to the corresponding address.

The IN-CSE 200 derives, based on the internal UE-ID (Int-ID) acquired from the MTC-IWF 320, that is, the IMSI in the present embodiment, an IP address of the GGSN/PGW 310, a receiving destination of the destination network, from the IP address (the public IP address) mapped with the UE-ID. Furthermore, the IN-CSE 200 sets the derived IP address in the destination address, and delivers the IP packet containing the Int-ID (IMSI) to the GGSN/PGW 310 (Step 4a).

The GGSN/PGW 310 identifies a private IP address mapped with the Int-ID (IMSI) included in the IP packet received from the IN-CSE 200 and assigned to the MTC-UE 100. That is, the GGSN/PGW 310 identifies the transmission address in the closed network (the PLMN 30).

Moreover, the GGSN/PGW 310 delivers to the MTC-UE 100 the IP packet in which the identified private IP address is set in the destination address, and receives from the MTC-UE 100 Delivered Ack that indicates successful delivery of the IP packet (Step 5).

Specifically, the procedure of delivering an IP packet from the GGSN/PGW 310 to the MTC-UE 100 (Step 5a) is similar to the common reception procedure of an incoming IP message in the PLMN. When the MTC-UE 100 is recognized to be in a dormant state, the GGSN/PGW 310 executes paging with respect to the MTC-UE 100 in the same manner as the common incoming IP message, and the MTC-UE 100 gets activated by the paging. Upon successfully receiving the IP packet delivered by the GGSN/PGW 310, the MTC-UE 100 transmits Delivered Ack to the GGSN/PGW 310.

The GGSN/PGW 310 transmits, based on the received Delivered Ack, the Delivered IP packet Ack (UE-ID, UE public IP address including the UE-ID to the IN-CSE 200 (Step 4b).

The IN-CSE 200 transmits, based on the Delivered IP packet Ack (UE-ID, UE public IP address received from the GGSN/PGW 310, to the AS 40A MT IP Triggering Ack (confirmed UE public IP address that includes a public IP address and an UE-ID assigned to the MTC-UE 100, and notifies the UE-ID of the corresponding public IP address (Step 1b). From Step 1b onwards, the AS 40A can directly deliver to the MTC-UE 100 the IP packet in which the public IP address included in the MT IP Triggering Ack (confirmed UE public IP address is set in the destination address, and can start downlink IP packet delivery (Step 6a).

On the other hand, when the IN-CSE 200 cannot receive the Delivered IP packet Ack (UE-ID, UE public IP address from the GGSN/PGW 310, the IN-CSE 200 detects that the downlink IP packet transmitted at Step 4a was not delivered (Step 6b). In such a case, the IN-CSE 200 uses, based on the T4 based SMS Push procedure (refer to the Section X.6.1.2 of Non-Patent Document 2), the SMS, and activates the reception of the incoming message from the AS 40A to the MTC-UE 100.

(4) Effects and Advantages

According to the communication system 10, when the MTC-UE 100 is attached to the PLMN 30 and the like, the MTC-UE 100 notifies the IN-CSE 200 of a public IP address assigned by the PLMN 30 and the UE-ID of the MTC-UE 100. Moreover, the IN-CSE 200, upon receiving the incoming message from the AS 40A and AS 40B to the MTC-UE 100, identifies, based on a public IP address mapped with the retained UE-ID of the MTC-UE 100, the GGSN/PGW 310, the receiving destination of the destination network, and delivers the IP packet containing the UE-ID to the GGSN/PGW 310. Furthermore, the GGSN/PGW 310 identifies, based on the internal UE-ID included in the IP packet received from the IN-CSE 200, a private IP address assigned to the MTC-UE 100, and transmits the IP packet in which the private IP address is set in the destination address to the MTC-UE 100.

Accordingly, in the environment where the NAT is used, an incoming message from the AS 40A and AS 40B that operate in accordance with the IP-based protocol can be received by the MTC-UE 100. In other words, according to the communication system 10, the MTC-UE 100 can receive an incoming message from the AS 40A and AS 40B, without using the short message service (SMS), or the ICE method, and the like that requires addition of a function in a network or a UE.

Furthermore, implementation of such IP native incoming message reception facilitates the simplification of a protocol stack or operations in the communication system 10 that executes the inter-working between the M2M platform 20 and the PLMN 30, successfully contributing to an inexpensive system architecture.

In the present embodiment, the IN-CSE 200 transmits, upon receiving from the GGSN/PGW 310 a positive acknowledgment (Delivered IP packet Ack (UE-ID, UE public IP address) for the IP packet delivered to the GGSN/PGW 310, to the AS 40A (or the AS 40B) an incoming message response (MT IP Triggering Ack (confirmed UE public IP address) containing the public IP address set in the destination address of the IP packet. Accordingly, the application server that received the corresponding public IP address can directly deliver the IP packet to the MTC-UE 100 by using the public IP address, and as a result, the processing load and traffic in the communication system 10 can be reduced.

In the present embodiment, when the IN-CSE 200 cannot receive the Delivered IP packet Ack (UE-ID, UE public IP address, the IN-CSE 200 notifies the MTC-UE 100 of the incoming message from the AS 40A (or the AS 40B) by using the SMS. Accordingly, the incoming message to the MTC-UE 100 can be notified with more reliability.

In the present embodiment, the IN-CSE 200 can deliver to the GGSN/PGW 310 an IP packet containing the transport layer port number mapped with the public IP address and the internal UE-ID. Therefore, even if the public IP address is shared by multiple MTC-UEs, the private IP address mapped with the corresponding public IP address can be identified depending on the combination of the public IP address and the port number.

In the present embodiment, the IN-CSE 200 can provide a mechanism to deliver an IP packet containing an Int-ID acquired from the MTC-IWF 320 to the GGSN/PGW 310. Therefore, even if the UE-ID used within and outside the PLMN 30 is different, it is possible to deliver the IP packet containing the internal UE-ID available in the PLMN 30 to the GGSN/PGW 310.

(5) Other Embodiments

The present invention has been explained above in detail by way of one embodiment. However, no part of the above disclosure or drawings shall be understood as limiting the scope of the present invention. Various alternative embodiments of the present invention will become clear to those skilled in the art after reading this disclosure.

For example, in the embodiment of the present invention explained above, even if it is possible for the IN-CSE 200 to deliver the IP packet containing the Int-ID acquired from the MTC-IWF 320 to the GGSN/PGW 310, such a functionality is not mandatory. Moreover, for the IN-CSE 200, even the functionalities such as delivering the IP packet containing the transport layer port number mapped with the public IP address and the UE-ID to the GGSN/PGW 310, and notifying of the incoming message from the AS 40A (or the AS 40B) to the MTC-UE 100 by using the SMS, are not mandatory.

Furthermore, the IN-CSE 200 need not necessarily transmit the MT IP Triggering Ack (confirmed UE public IP address) to the AS 40A (or the AS 40B).

Moreover, in the present embodiment explained above, even if the PLMN 30 is explained as an example according to the 3G or the LTE, the PLMN 30 can be in accordance with the 2G (GSM (a registered trademark)).

The present invention explained above can be expressed as follows. According to an aspect of the present invention, a communication system 10 (a communication system) includes a PLMN 30 (a radio communication network) that includes a GGSN/PGW 310 (a gateway device) that can be connected by radio to an MTC-UE 100 (an MTC user device) that executes an inter-machine communication, and that executes a conversion between a private IP address and a public IP address assigned to the MTC user device, and an M2M platform 20 (an M2M platform) that includes an IN-CSE 200 (a service control device) that is connected to the radio communication network and that controls a service related to the inter-machine communication. The MTC user device includes an IP address notifying unit 107 (an IP address notifying unit) that notifies the service control device of the public IP address assigned by the radio communication network. The service control device includes an IP address acquiring unit 201 (an IP address acquiring unit) that acquires the public IP address notified from the MTC user device; an address table retaining unit 203 (a retaining unit) that maps and retains a device identifier for identifying the MTC user device and the public IP address acquired by the IP address acquiring unit; an incoming message receiving unit 205 (an incoming message receiving unit) that receives an incoming message addressed to the MTC user device from AS 40A and AS 40B (an application server) positioned outside the radio communication network; and an IP packet processing unit 211 (an IP packet processing unit) that sets, when the incoming message receiving unit received the incoming message, the public IP address mapped with the device identifier retained in the retaining unit in a destination address, and delivers an IP packet containing the device identifier to the gateway device. The gateway device includes an address identifying unit 313 (an address identifying unit) that identifies, based on the device identifier included in the IP packet received from the service control device, a private IP address assigned to the MTC user device.

According to the above aspect of the present invention, the IP packet processing unit can transmit, upon receiving from the gateway device a positive acknowledgment (MT IP Triggering Ack (confirmed UE public IP address) for the IP packet containing the device identifier delivered to the gateway device, an incoming message response including the public IP address set in the destination address of the IP packet to the application server.

According to the above aspect of the present invention, the communication system can include an SMS processing unit 213 (an SMS processing unit) that notifies, when the positive acknowledgment for the IP packet delivered to the gateway device cannot be not received, the MTC user device of an incoming message from the application server by using a short message service that does not use Internet protocol.

According to the above aspect of the present invention, the public IP address is shared by multiple MTC user devices, the IP packet processing unit can deliver an IP packet containing a port number of a transport layer mapped with the device identifier and the public IP address to the gateway device.

According to the above aspect of the present invention, the service control device further includes an ID processing unit 209 (an identifier acquiring unit) that acquires from the radio communication network an internal device identifier that can identify the MTC user device within the radio communication network and that is mapped with the device identifier retained in the retaining unit. The IP packet processing unit can deliver an IP packet containing the internal device identifier acquired by the identifier acquiring unit to the gateway device.

According to the above aspect of the present invention, the IP address notifying unit can notifies the service control device of the public IP address and the device identifier. The IP address acquiring unit can acquire the public IP address and the device identifier notified from the MTC user device. The retaining unit can map and retain the public IP address and the device identifier acquired by the IP address acquiring unit.

According to another aspect of the present invention, a service control device is connected to a radio communication network that includes a gateway device that executes a conversion between a public IP address and a private IP address assigned to an MTC user device that executes an inter-machine communication, and controls a service related to the inter-machine communication. The service control device includes an IP address acquiring unit that acquires the public IP address assigned to the MTC user device; a retaining unit that maps and retains the public IP address acquired by the IP address acquiring unit and a device identifier for identifying the MTC user device; an incoming message receiving unit that receives an incoming message addressed to the MTC user device from an application server positioned outside the radio communication network; and an IP packet processing unit that sets, when the incoming message receiving unit received the incoming message, the public IP address mapped with the device identifier retained in the retaining unit in a destination address, and delivers an IP packet containing the device identifier to the gateway device.

According to still another aspect of the present invention, an MTC user device that can be connected by radio to a radio communication network that includes a gateway device that executes a conversion between a private IP address and a public IP address, and that executes an inter-machine communication with an M2M platform that constitutes a service control device, includes an IP address notifying unit that notifies the service control device of a public IP address assigned by the radio communication network.

According to still another aspect of the present invention, a gateway device that executes a conversion between a private IP address and a public IP address assigned to an MTC user device that executes an inter-machine communication includes an address identifying unit that identifies a private IP address assigned to the MTC user device based on a device identifier for identifying the MTC user device included in the IP packet received from a service control device that controls a service related to the inter-machine communication.

According to still another aspect of the present invention, a communication method that uses a radio communication network that includes a gateway device that can be connected by radio to an MTC user device that execute an inter-machine communication and that executes a conversion between a private IP address and a public IP address assigned to the MTC user device, and an M2M platform that includes a service control device that is connected to the radio communication network and that controls a service related to the inter-machine communication includes, the MTC user device notifying the service control device of a public IP address assigned by the radio communication network; the service control device acquiring the public IP address notified from the MTC user device, mapping and retaining the acquired public IP address and a device identifier for identifying the MTC user device, receiving an incoming message addressed to the MTC user device from an application server positioned outside the radio communication network, and setting, upon receiving the incoming message, the public IP address mapped with the retained device identifier in a destination address, and delivering an IP packet containing the device identifier to the gateway device; and the gateway device identifying, based on the device identifier included in the IP packet received from the service control device, a private IP address assigned to the MTC user device.

It is needless to mention that the present invention includes embodiments and the like that are not disclosed above. Therefore, the technical scope of the present invention shall be determined based on the matter(s) specifying the invention that corresponds to the appropriate scope of the claims in view of the above disclosure.

The entire contents of Japanese Patent Applications 2013-247963 (filed on Nov. 29, 2013) is incorporated in the description of the present application by reference.

INDUSTRIAL APPLICABILITY

According to one aspect of the present invention, it is possible to provide a communication system, a service control device, an MTC user device, a gateway device, and a communication method that allow an incoming message to be received by the MTC user device from an application server that operates according to an IP-based protocol and receives the message at low cost without using a short message service (SMS) in an environment where a NAT is used.

EXPLANATION OF REFERENCE NUMERALS

10 Communication system
20 M2M platform
30 PLMN
40A, 40B AS
50 DHCP server
60 DNS server
100 MTC-UE
101 Attach procedure executing unit
103 DHCP processing unit
105 DNS processing unit
107 IP address notifying unit
200 IN-CSE
201 IP address acquiring unit 203 Address table retaining unit
205 Incoming message receiving unit
207 DNS processing unit
209 ID processing unit
211 IP packet processing unit
213 SMS processing unit
310 GGSN/PGW
311 IP packet processing unit
313 Address identifying unit
320 MTC-IWF

The invention claimed is:

1. A communication system comprising:
a radio communication network that includes a gateway device that can be connected by radio to a Machine Type Communication (MTC) user device that executes an inter-machine communication and that executes a conversion between a private IP address and a public IP address assigned to the MTC user device; and
a Machine-to-Machine (M2M) platform that includes a service control device that is connected to the radio communication network and that controls a service related to the inter-machine communication,
wherein the MTC user device
notifies the service control device of the public IP address assigned by the radio communication network,
wherein the service control device includes:
a receiver that receives the public IP address notified from the MTC user device and that is configured to receive an incoming message addressed to the MTC user device from an application server positioned outside the radio communication network;
a processor coupled to a memory that:
maps and retains the received public IP address and a device identifier for identifying the MTC user device; and
when the receiver receives the incoming message, sets the public IP address mapped with the device identifier in a destination address; and
a transmitter that transmits, after the processor sets the public IP address mapped with the device identifier in the destination address, an IP packet containing the device identifier to the gateway device, and
wherein the gateway device identifies, based on the device identifier included in the IP packet received from the service control device, a private IP address assigned to the MTC user device.

2. The communication system as claimed in claim 1, wherein
the transmitter transmits, upon receiving from the gateway device a positive acknowledgment for the IP packet that includes the device identifier, an incoming message response including the public IP address set in the destination address of the IP packet to the application server.

3. The communication system as claimed in claim 1, wherein when the positive acknowledgment for the IP packet delivered to the gateway device cannot be received, the transmitter transmits to the MTC user device an incoming message from the application server by using a Short Message Service that does not use Internet Protocol.

4. The communication system as claimed in claim 1, wherein
the public IP address is shared by multiple MTC user devices, and
the transmitter transmits to the gateway device an IP packet containing a port number of a transport layer mapped with the device identifier and the public IP address.

5. The communication system as claimed in claim 1, wherein
the receiver receives from the radio communication network an internal device identifier that can identify the MTC user device in the radio communication network and that is mapped with the retained device identifier, and
the transmitter transmits to the gateway device an IP packet containing the received internal device identifier.

6. The communication system as claimed in claim 1, wherein
the MTC user device notifies the service control device of the public IP address and the device identifier,
the receiver receives the public IP address and the device identifier notified from the MTC user device, and
the processor coupled to the memory maps and retains the public IP address and the received device identifier.

7. A service control device that is connected to a radio communication network that includes a gateway device that executes a conversion between a private IP address and a public IP address assigned to a Machine Type Communication (MTC) user device that executes an inter-machine communication, and that controls a service related to the inter-machine communication, the service control device comprising:
a receiver that receives the public IP address assigned to the MTC user device and that is configured to receive an incoming message addressed to the MTC user device from an application server positioned outside the radio communication network;
a processor coupled to a memory that:
maps and retains the received public IP address and a device identifier for identifying the MTC user device; and
when the receiver receives the incoming message, sets the public IP address mapped with the device identifier in a destination address; and
a transmitter that transmits, after the processor sets the public IP address mapped with the device identifier in the destination address, an IP packet containing the device identifier to the gateway device.

8. A gateway device that executes a conversion between a private IP address and a public IP address assigned to a Machine Type Communication (MTC) user device that executes an inter-machine communication, the gateway device comprising:
a processor that identifies a private IP address assigned to the MTC user device based on a device identifier for identifying the MTC user device included in the IP packet received from a service control device that executes a service related to the inter-machine communication,
wherein the IP packet is received from the service control device after the service control device sets the public address that is mapped with the device identifier in a destination address.

9. A communication method that uses a radio communication network that includes a gateway device that can be connected by radio to a Machine Type Communication (MTC) user device that executes an inter-machine communication and that executes a conversion between a private IP address and a public IP address assigned to the MTC user device, and a Machine-to-Machine (M2M) platform that includes a service control device that is connected to the radio communication network and that controls a service related to the inter-machine communication, the communication method comprising:
  the MTC user device
    notifying the service control device of a public IP address assigned by the radio communication network,
  the service control device
    acquiring the public IP address notified from the MTC user device,
    mapping and retaining the acquired public IP address and a device identifier for identifying the MTC user device,
    receiving an incoming message addressed to the MTC user device from an application server positioned outside the radio communication network,
    setting, upon receiving the incoming message, the public IP address that is mapped with the retained device identifier in a destination address, and
    transmitting, after the service control device sets the public IP address mapped with the device identifier in the destination address, an IP packet containing the device identifier to the gateway device, and
  the gateway device
    identifying, based on the device identifier included in the IP packet received from the service control device, a private IP address assigned to the MTC user device.

\* \* \* \* \*